2,675,892

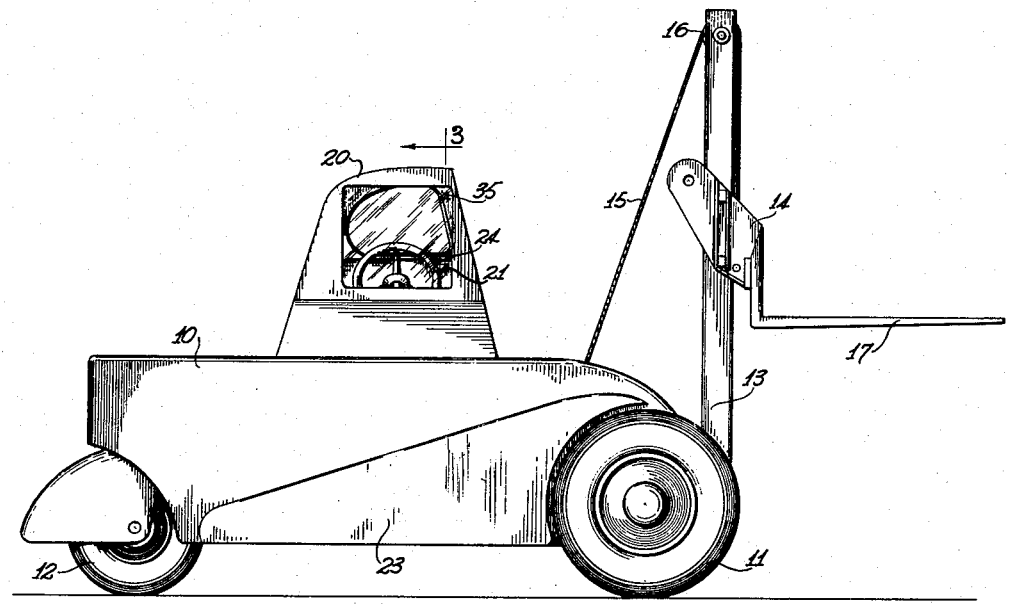
Fig. 1
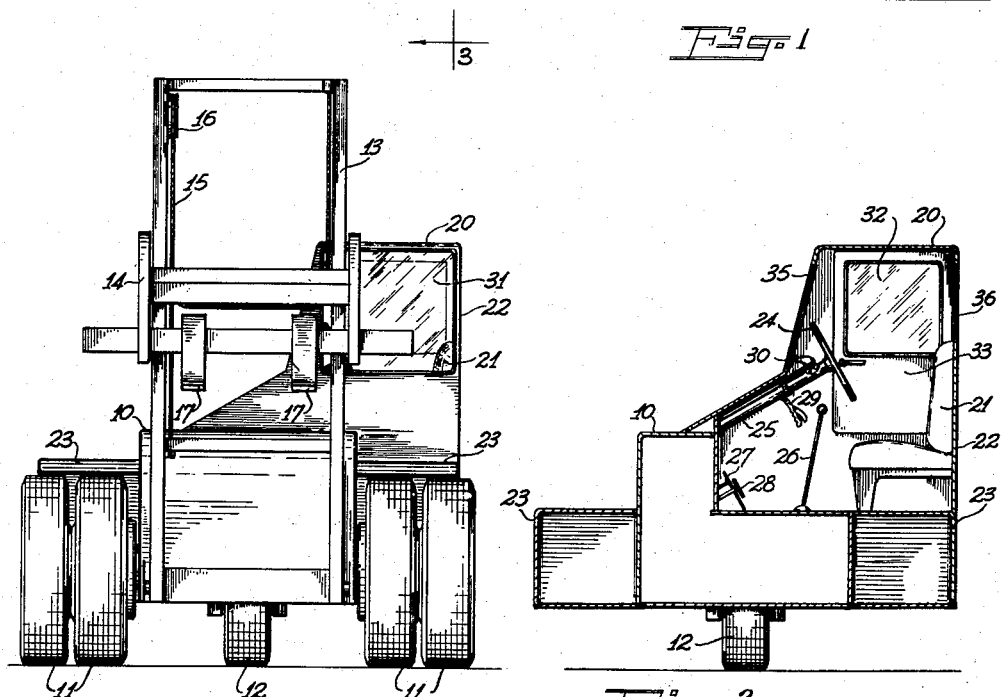
Fig. 2
Fig. 3
INVENTOR.
HAROLD A. WAGNER
BY
Buckhorn and Cheatham
ATTORNEYS Patented Apr. 20, 1954

UNITED STATES PATENT OFFICE 2,675,892

INDUSTRIAL VEHICLE WITH OFFSET TRANSVERSE DRIVER'S SEAT

Harold A. Wagner, Portland, Oreg.

Application December 20, 1951, Serial No. 262,562

7 Claims. (Cl. 187—9)

My present invention relates to industrial vehicles and comprises an improvement whereby safety and maneuverability are increased by providing better visibility for the operator. The invention is of particular utility in a vehicle comprising a material elevating tower such as disclosed and claimed in the patent to Wagner et al., No. 2,450,102, issued September 28, 1948, or any vehicle provided with similar work handling means.

The principal object of the present invention is to provide a vehicle in which the operator has a clear, unobstructed view ahead of the vehicle. This object of the invention is achieved by placing the cab in an offset relation to the chassis of the vehicle, and in having the operator of the vehicle seated therein so as to face transversely across the vehicle. The vehicle is provided with the usual controls, such as a manual steering wheel and means for controlling the movement of the automotive vehicle and the operation of the material elevating tower, all of which are arranged in conventional relation to a driver's seat arranged in the cab, with the back of the driver's seat located outwardly of the chassis. This object of the invention is also achieved in part by providing the driver's cab with front and rear windows, the outer edges of which substantially coincide with the outer wall of the cab. Thus applicant has provided a vehicle wherein the operator is protected from inclement weather and the danger of objects falling from the material handling tower, and in which the driver may observe to the front and to the rear merely by glancing sideways.

This application is a continuation-in-part of my previous application Serial No. 38,644, filed July 14, 1948, now abandoned. Reference is herein made to the patent to Eddie B. Wagner, No. 2,503,131, issued April 4, 1950, resulting from an application also filed on July 14, 1948, wherein operative details of a vehicle including my present invention are set forth.

The objects and advantages of the present invention will be more fully apparent from inspection of the accompanying drawings wherein:

Fig. 1 is a side elevation of a lift vehicle;

Fig. 2 is a front elevation thereof; and

Fig. 3 is a partially schematic, vertical section taken substantially along line 3—3 of Fig. 2, omitting all mechanism from the interior of the chassis.

The invention is herein illustrated in association with a vehicle comprising a chassis 10 mounted upon spaced pairs of front driving wheels 11 and a rear tiller wheel 12. A track tower 13 is mounted at the front of the vehicle, the tower comprising a frame including spaced upright tracks, the outer edges of the frame extending vertically above the front corners of the chassis, and a carriage 14 is moved along the track tower by means of a cable 15 passing about a pulley 16 at the top of the tower and winch means (not shown) in the chassis under control of the operator. A material handling device exemplified herein by fork tines 17 is mounted upon the carriage 14. Obviously various other working instrumentalities such as buckets, scoops, hay forks, scraper blades, platforms and the like, may be mounted upon the carriage.

The present invention comprises so locating the driver's cab as to have the cab 20 offset laterally with respect to the longitudinal centerline of the chassis 10, and providing a driver's seat 21 therein beyond the side of the chassis and facing transversely across the chassis. Preferably the rear wall 22 of the cab forms a backing for back of the seat. The wall 22 lies in vertical alignment with the outer wall of one of a pair of lateral extensions 23 of the chassis, the forward ends of which form front fenders and the tops of which form ramps leading to the top of the chassis and into the cab. The steering wheel 24 is so located in the cab as to be in front of the driver's seat, preferably being mounted upon a steering wheel post 25 extending diagonally downward across the vehicle. Suitable controls such as a gear shift lever 26, throttle 27, clutch pedal 28, hand brake 29, and carriage or other control levers 30, are mounted in the cab convenient to the operator's reach. The cab is preferably provided with a front window 31 of large size and a correspondingly large window 32 in an access door 33 which faces the rear of the vehicle. The cab is also preferably provided with a large window 35 facing across the vehicle and a window 36 above the rear wall 22. It will be noted that the outer edges of both windows 31 and 33 are outwardly from the back of the seat so that the operator can view the ground a few inches ahead of the left front wheels 11 and a few inches to the side of the tiller wheel 12 without shifting his head. The operator is able to see past the track tower and carriage and, similarly, will be able to see past most operating instrumentalities on any type of vehicle. By positioning the steering hand wheel as illustrated, the operator is not confused as to the direction in which the vehicle will turn when he turns the hand wheel. If he wishes to have the vehicle swing toward the left when moving in a forward direction, he turns the wheel toward the left just as in normal driving. Similarly, if he is moving toward the rear and wishes to have the vehicle swing toward the right, he turns the wheel to the right just as in normal driving.

It is to be noted that the dual wheels 11 create an illusion of greater width of the chassis than is actually the case. The sides of the chassis lie inside of the inner front wheels and the extensions 23 project laterally from the sides of the chassis. The lateral extensions 23 are hollow structures built onto the sides of the chassis, the interiors thereof providing spaces for tools, et cetera, the forward ends thereof providing fenders for the front wheels, and the upper surfaces thereof being inclined and providing ramps up which the operator may climb, one of the ramps leading directly to the rear door 33. The extension on the side at which the cab is located provides the base for the seat 21, so that the seat is wholly offset from the chasis 10.

Having illustrated and described a preferred embodiment of the invention, it should be apparent to those skilled in the art that the invention permits of modification in details and arrangement. I claim as my invention all such modifications as come within the true spirit and scope of the appended claims.

I claim:

1. A self-propelled industrial vehicle comprising a chassis, a material handling device mounted at the front of the chassis and including an upright frame of substantially the same width as the chassis, the lateral edges of said frame being substantially in vertical alignment with the front corners of said chassis, a driver's cab located intermediate the ends of the chassis and facing transversely across the vehicle, said cab being offset to one side of the chassis and extending outwardly beyond the side of the chassis, and a driver's seat mounted entirely within the outwardly extending portion of said cab beyond the side of the chassis and facing transversely across the vehicle.

2. A self-propelled industrial vehicle comprising a chassis, a material handling device mounted at the front of the chassis and including an upright frame located between the sides of the chassis, a driver's cab located intermediate the ends of the chassis, said cab being offset laterally from the longitudinal centerline of the chassis and including a portion extending beyond the side of the chassis, said cab having a front window extending outwardly beyond the side of the chassis to the outer edge of said cab, and a driver's seat mounted entirely within said portion of the cab and facing transversely across the vehicle, said seat being outwardly from the side of the chassis and including a back lying closely adjacent the outer wall of said cab.

3. A self-propelled industrial vehicle comprising a chassis, a track tower mounted at the front of the chassis and including upright tracks located each at a front corner of the chassis, a driver's cab located intermediate the ends of the chassis, said cab being offset laterally and overhanging a side of the chassis, said cab including a window in the forward wall thereof, said window having its outer edge beyond the side of the chassis and adjacent the outer wall of the cab, and a driver's seat mounted entirely within the portion of the cab overhanging the side of the chassis and facing transversely across the vehicle, said seat having a back substantially contiguous to the outer wall of the cab whereby a driver seated in the cab may look past said tower without shifting from an upright, seated position.

4. A self-propelled industrial vehicle comprising a chassis, a material handling device mounted at one end of said chassis and comprising an upright frame having its lateral edges extending above the front corners of said chassis, a driver's cab positioned to the rear of said device and offset laterally so as to extend beyond one side of said chassis, a driver's seat positioned in said cab entirely outwardly from said one side of the chassis and against the outer wall of the cab, said seat having an upright back closely adjacent the outer wall of said cab, and vehicle and material handling device control means adjacent said seat including a steering hand wheel in front of said seat in conventional relation thereto whereby the driver may glance over either shoulder in order to control the movement of the vehicle, said cab including a front window and a rear window, each of said windows extending to the outer wall of said cab.

5. A self-propelled industrial vehicle comprising a chassis, a material handling device mounted at one end of said chassis and comprising an upright frame having its lateral edges projecting above the front corners of said chassis, a driver's cab positioned to the rear of said device and including a portion offset laterally beyond one side of said chassis, a driver's seat backed against the outer wall of said cab and positioned entirely beyond the side of the chassis, and vehicle and material handling device control means adjacent said seat including a steering hand wheel in front of said seat in conventional relation thereto whereby the driver may look over either shoulder in order to control the movement of the vehicle, said cab including a front window and a rear window, the outer edges of each of said windows being longitudinally aligned with the back of the driver's seat.

6. A self-propelled industrial vehicle comprising a chassis, a material handling device mounted at one end of said chassis and comprising an upright frame having its lateral edges projecting above the front corners of said chassis, a driver's cab positioned to the rear of said device and offset beyond one side of said chassis, a driver's seat positioned in said cab entirely outwardly of said chassis and with the back of the seat against the outer wall of said cab, vehicle and material handling device control means adjacent said seat, including a steering hand wheel in front of said seat in conventional relation thereto whereby the driver may look over either shoulder in order to control the movement of the vehicle, said cab including a front window and a rear window, the outer edges of each of said windows being substantially longitudinally aligned with the outer surface of said back of the driver's seat, and an extension of said chassis on said one side of the chassis, said extension providing the base for said seat.

7. A self-propelled industrial vehicle comprising a chassis, a material handling device mounted at one end of said chassis and comprising an upright frame having its lateral edges projecting above the front corners of said chassis, a driver's cab positioned to the rear of said device and offset beyond one side of said chassis, a driver's seat positioned in said cab entirely outwardly of said one side of the chassis and with the back of the seat against the outer wall of said cab, vehicle and material handling device control means adjacent said seat, including a steering hand wheel in front of said seat in conventional relation thereto whereby the driver may look over either shoulder in order to control the movement of the vehicle, said cab including a front window and a rear window, the outer edges of each of said windows being substantially longitudinally aligned with the outer surface of said back of the driver's seat, and an extension of said chassis on said one side of the chassis, said extension providing the base for said seat, said extension having an inclined upper surface beyond said cab providing a ramp leading to said cab, and said cab having a door opening onto said ramp and in which said rear window is located.

References Cited in the file of this patent

UNITED STATES PATENTS

| Number | Name | Date |
|---|---|---|
| D. 157,452 | Wagner | Feb. 21, 1950 |
| 1,169,153 | Hibacsko | Jan. 25, 1916 |
| 2,143,983 | Howell | Jan. 17, 1939 |
| 2,320,601 | Howell | June 1, 1943 |
| 2,503,180 | Wagner | Apr. 4, 1950 |
| 2,503,181 | Wagner | Apr. 4, 1950 |